June 24, 1930.  M. L. STRAWN  1,768,270
APPARATUS FOR PREPARING MEMBERS FOR ASSEMBLY
Filed April 13, 1927
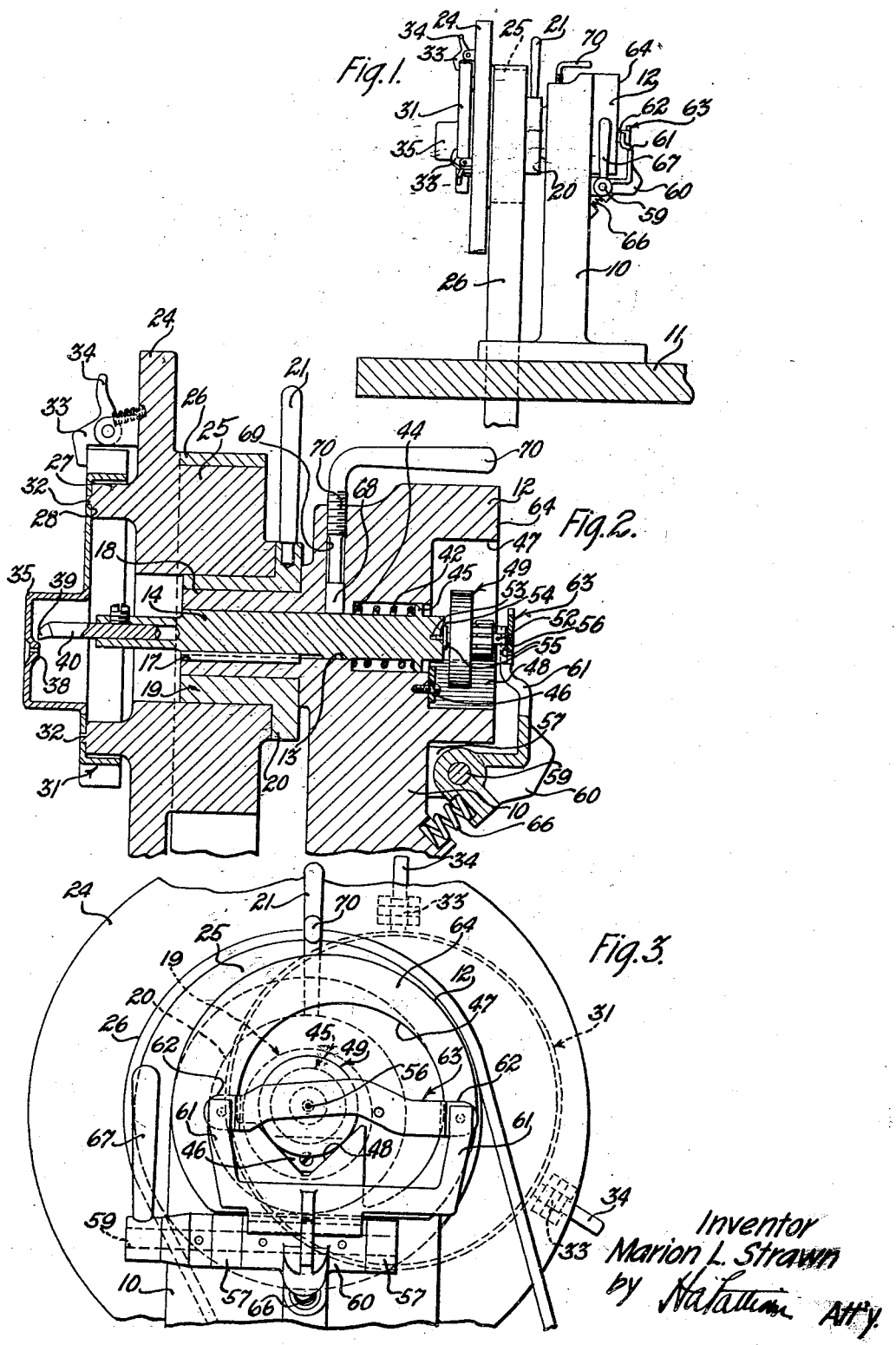
Inventor
Marion L. Strawn
by /s/ Atty.

Patented June 24, 1930

1,768,270

UNITED STATES PATENT OFFICE

MARION LLEWLLYN STRAWN, OF LA GRANGE, ILLINOIS, ASSIGNOR TO WESTERN ELECTRIC COMPANY, INCORPORATED, OF NEW YORK, N. Y., A CORPORATION OF NEW YORK

APPARATUS FOR PREPARING MEMBERS FOR ASSEMBLY

Application filed April 13, 1927. Serial No. 183,426.

This invention relates to apparatus for preparing members for assembly, and more particularly to apparatus for preparing a part of a telephone calling device for assembly.

This invention is particularly applicable in preparing for assemblage an inside bearing boss of a governor cup of a telephone calling device of the type disclosed in U. S.
Patent No. 1,161,854, issued to O. F. Forsberg, November 30, 1915, but it should be understood that it is capable of other applications. Upon the boss one end of a governor shaft is journaled, the opposite end thereof being journaled in a bridge piece secured to a case member in the final assemblage of the device, thrust washers being provided on the shaft between the boss and the bridge piece at either end of the shaft.
Heretofore, due to slight manufacturing variations in the dimensions of the particular parts to be assembled and to provide proper clearances between the rotatable and stationary parts, it has been the practice in some instances to selectively assemble with the parts washers of the thickness requisite to provide for a predetermined overall dimension which will fill the space between the opposed flat surfaces of the bearing boss of the individual cup and associated bridge piece.

The objects of this invention are to provide an improved apparatus for accurately preparing parts for assemblage in an efficient and economical manner.

In accordance with the general features of this invention, as embodied in one form thereof, an apparatus is provided, which includes means for revolvably supporting a part to be machined in cooperative relation with a cutting tool, which is stationary during the machining operation, the effectiveness of the tool, or the amount of material displaced by the tool on the revolving part being controlled by the overall dimensions of the partially assembled parts to be finally assembled with the first mentioned part, which partially assembled parts are used as a gauge to longitudinally position the cutting edge of the tool with respect to the surface to be machined. Means are provided for holding the preliminarily assembled parts in cooperating relation with the tool during the machining operation and also for laterally moving the revolving part past the cutting edge of the stationary tool to perform the machining operation.

Other objects and advantages of this invention will more fully appear from the following detailed description taken in connection with the accompanying drawings which illustrate one embodiment of an apparatus for preparing parts for assemblage, in which—

Fig. 1 is a side view of an apparatus designed for preparing a part of a telephone calling device for assemblage;

Fig. 2 is an enlarged, fragmentary, vertical section thereof, and

Fig. 3 is a fragmentary end view of Fig. 2 looking toward the left.

Referring now to the drawings in detail wherein like reference numerals indicate similar parts, an upright standard or frame 10 suitably secured to the upper surface of a bench 11 or other supporting means is provided with a head 12. Reciprocably mounted in a bore 13 formed longitudinally in the head 12 is a plunger 14, which is retained from rotation therein by a spline 17. Free to rotate upon an annular shouldered portion 18 extending from the left end of the head 12 is an eccentric sleeve 19 provided with a flange 20 at its right end. To the peripheral surface of the flange 20 is fixed a handle 21 whereby the eccentric may be rotated upon the portion 18 of the head 12 as will be referred to hereinafter. Rotatably mounted upon the eccentric sleeve 19 is a wheel 24, a reduced annular portion 25 at the right end thereof being engaged by a driving belt 26 which in the operation of the apparatus may be driven from any suitable source of power (not shown). A further reduced annular portion 27 of the wheel 24 at the left end thereof is provided with a flat machined end face 28, the diameter of the annular portion being such that the inside diameter of a circular flange of a case member for a telephone calling device 31 may freely fit therein with a flat inside surface of the case abutting the flat end face 28. The end face 28 is provided with a pair of diametrically opposed pins 32 arranged to enter a pair of openings formed in the flat wall of the case member 31 for predeterminedly positioning the latter member axially upon the head 12, the openings in the case member being used for securing thereto another part of the calling device which will be referred to hereinafter. Pivotally mounted upon the left or outer face of the wheel 24 are a plurality of spring pressed clamping jaws 33 for engaging and retaining the case member 31 in operative position upon the wheel, handles 34 being provided for opening the jaws when mounting or removing the case member.

Eccentrically secured to the case member 31 upon its outer flat face is a circular governor cup 35 axially provided with an apertured bearing boss 38 on its inside flat surface which in the operation of the apparatus to be presently described is machined by a cutting edge or point 39 of a stationary tool 40 fixed to the left end of the plunger 14. The right end of the bore 13 of the head 12 is of greater diameter than the plunger 14 mounted therein and surrounding the plunger 14 within the space thus formed is a compression spring 42, opposite ends thereof engaging a shoulder 44 formed in the head 12 along the bore 13 and an annular flange 45 formed on the plunger 14, the flange 45 being slidably mounted in the enlarged portion of the base 13. The spring 42, it will be apparent, tends normally to move the plunger 14 toward the right along the bore 13 and is limited in this movement by a stop plate 46 fixed to the head 12 at the end of the bore, the flange 45 of the plunger engaging the stop.

The right end of the head 12 is provided with a comparatively large recess 47 which, as clearly shown in Fig. 3, is eccentrically disposed with respect to the axis of the bore 13 and plunger 14. Within the recess 47 and integral with the surrounding wall and disposed directly below and centered with the plunger 14 is a cradle 48 comprising similar vertically inclined surfaces so arranged that upon entering a governor assemblage 49, forming a part of the telephone calling device of the type hereinbefore mentioned within the recess, the peripheral surface thereof will engage the inclined surfaces, in which position the axis of a shaft 52 of the governor and the axis of the plunger 14 is a depression 53 adapted to in the projecting right end face of the plunger 14 is a depression 43 adapted to receive a reduced left end 54 of the governor shaft 52. When mounting the governor assemblage 49 upon the cradle 48 a thrust washer 55 is positioned upon either end of the shaft 52, the right end thereof also having a reduced end 56 which will be referred to presently again. After positioning the governor assemblage 49 upon the cradle 48 it is moved longitudinally thereon to insert the reduced end 54 of the shaft 52 within the depression 53 of the plunger 14.

Rotatably mounted in a pair of spaced lugs 57 formed upon the right end of the frame 10 below the outer wall of the recess 47 of the head 12 is a shaft 59. Fixed to the shaft 59 between the inner faces of the lugs 57 is a lever 60 having a pair of upwardly and outwardly extending arms 61 (Fig. 3) each arranged to engage an outer surface of a foot 62 formed at either end of a bridge piece 63 also forming a part of the telephone calling device hereinbefore referred to, the opposite inner surfaces of the feet 62 resting against a machined end face 64 of the head 12 at diametrically opposite sides of the peripheral wall of the eccentrically disposed recess 47. A compression spring 66, opposite ends of which are entered in pockets formed in the standard 10 and the lever 60 tend to normally rotate the lever in a counter-clockwise direction (Fig. 2) to clamp the bridge piece 63 against the end face of the head. In positioning the bridge piece 63 as just described an aperture provided therein, upon which the reduced end 56 of the shaft 52 is journaled in the final assemblage of the telephone calling device, is alined with the end 56 of the shaft which is entered therein. It is to be understood that the tension of the spring 66 acting upon the lever 60 is sufficient to overcome the force of the spring 42 tending to move the plunger 14 to the right. Upon the left end of the shaft 59 (Fig. 3) is a handle 67 for operating the lever 60 when mounting or removing the bridge piece 63 from the reduced end 56 of the governor shaft 52 and the machined end face of the head 12.

In the final assemblage of the telephone calling device as clearly shown in the aforementioned patent, the inner surfaces of the feet 62 of the bridge piece 63, shown engaging the machined end face of the head 12, are engaged with and secured to the inner flat surface of the case member 31, shown as clamped against the flat machined end face 28 of the wheel 24, the governor assemblage being rotatably mounted between the boss 38 of the case member 31 and the bridge piece 63. It will be apparent from the foregoing description upon mounting the governor assemblage 49 between the right end of the plunger 14 and the inside surfaces of the arms 61 of the lever 60 as just described, that the plunger 14 will be moved against the action of the spring 42 along the bore 13 and cause the cutter 40 to extend into the governor housing 35, from the inside flat surface of the case member 31, a distance which will be equal to the overall length of the particular parts comprising the governor assemblage. After the governor assemblage 49 and bridge piece 63 have been clamped upon the head 12 and thereby correctly positioning the cutter 40, the latter is prevented from moving toward the right due to any end thrust thereon during the cutting operation, to be presently described, by a shoe 68 mounted in an aperture 69 formed in the head 12. The shoe 68 is clamped against the peripheral surface of the plunger 14 by a handled pin 70 threaded into the upper end of the aperture 69. The pitch of the thread on the pin 70 and the wall of the aperture 69 is such that a quarter revolution of the handle provided on the pin one way or the other is sufficient to clamp the shoe 68 or release it, respectively.

With the case member 31 and the governor assemblage 49 and bridge piece 63 clamped upon the wheel 24 and head 12, respectively, and the cutter 40 clamped in its predetermined position, as just described, the operation of preparing the bearing boss 38 of the case member by machining it for the final assemblage of the calling device is as follows: The wheel 24 is caused to rotate at a comparatively high rate of speed through the driving belt 26 which is connected to a source of power (not shown) and simultaneously with the rotation of the wheel the handle 21 is moved in a counter-clockwise direction (Fig. 3) through an angle of 90°. Thus the rotating boss 38 is laterally swung along a curved path and into engagement with the stationary cutting edge 39 of the cutter 40, thereby resulting in the inner flat face being turned down, sufficient metal being removed to permit the governor assemblage and the bridge piece to be mounted upon the case member with a predetermined accuracy in the final asemblage of the calling device. As previously described the lateral movement of the boss 38 during its rotation is accomplished through the mounting of the belt driven wheel 24 upon the eccentric sleeve 19. The cutter 40 is adjustably mounted upon the plunger 14 as shown, so that it may be adjusted thereon after sharpening upon wearing down at its cutting edge, whereby the overall length of the plunger and cutter will remain constant for a particular set up of parts to be prepared for assemblage.

By means of this invention wherein the bearing boss 38 is prepared to accurately accommodate the particular governor assemblage to be associated therewith it is not necessary to maintain the dimensions of the parts composing the governor within extremely close limits nor to so select the parts as to produce a governor having closely limited overall dimensions. Although this invention has herein been described in connection with a telephone calling device, it will be understood that the invention is capable of other applications where partial assemblies are to be assembled with other parts in finally assembling an article and is only limited by the scope of the appended claims.

What is claimed is:

1. In apparatus for preparing a member for assemblage with another member, a material working means, means for normally urging the working means in one direction, means eccentrically mounted for supporting a member to be prepared for assemblage adjacent a working portion of the working means, means for holding another member forming a part of the assemblage in operative relation with another portion of the working means to control the effectiveness of the working means, and means for causing a relative movement between the first member and the working means to prepare the first-mentioned member for a predetermined assembled relation with the latter member.

2. In apparatus for preparing a member for assemblage with another member, a longitudinally movable tool, means for guiding the tool, means for normally urging the tool to a nonoperative position, means eccentrically mounted for supporting a member in position to be worked on adjacent the tool, means for maintaining another member to be assembled with the first member in engagement with the tool to displace the tool an amount determined by an overall dimension of the latter member, and means for causing a relative movement between the first member and the tool to prepare the first-mentioned member for a predetermined assembled relation with the latter member.

3. In apparatus for preparing a member for assemblage with another member, a longitudinally movable tool, means for guiding the tool, means normally urging the tool to a non-operative position, an element eccentrically and rotatably mounted upon the tool guiding means for supporting a member in position to be worked on adjacent the tool, means for maintaining another member to be assembled with the first member in operative relation with the tool to displace the tool an amount determined by an overall dimension of the latter member, and means for simultaneously rotating and moving the element upon its eccentric mounting to cause the engagement of the member supported thereon with the tool to prepare the first-mentioned member for a predetermined assembled relation with the latter member.

4. In apparatus for preparing a part for assemblage with other parts, a longitudinally movable tool, means for guiding the tool, means normally urging the tool to a non-operative position, means for supporting a part in position to be worked on adjacent the tool, means for preliminarily holding a second part of the device in assembled relation with a plurality of parts which are to be assembled as a unit with the first part and for maintaining the unit in operative relation with the tool, the mounting of the unit and latter part causing the tool to be displaced an amount determined by an overall dimension of the unit and the latter part, and means for causing a relative movement between the first part and the tool to prepare the first-mentioned part for a predetermined assembled relation with the unit and the latter part.

5. In apparatus for preparing a part for assemblage with other parts, a longitudinally movable cutting tool, means for guiding the tool, resilient means for normally urging the tool to a non-operative position, means mounted upon the tool guiding means for rotatably supporting a part in position to be worked adjacent the tool, means for preliminarily holding a second part in assembled relation with a plurality of parts which are to be assembled as a unit with the first part and for maintaining the unit in engagement with one end of the tool, the mounting of the unit and the latter part causing the tool to be displaced an amount predetermined by an overall dimension of the unit and the latter part, and means for rotating the support for the first part and simultaneously therewith moving the first part into engagement with the tool to cause a machining thereof to prepare the first-mentioned part for a predetermined assembled relation with the unit and the latter part.

6. In apparatus for preparing a part for assemblage with other parts, a frame, a material working tool guided thereon, means normally urging the tool to a non-operative position, means for supporting a part in position to be worked on adjacent the working end of the tool, means within a recess provided in the frame for guiding a second part into predetermined relation with the opposite end of the tool, means for clamping opposite portions of a third part to the frame at opposite sides of the recess with an intermediate portion thereof engaging the second part and maintaining it against the opposite end of the tool to control the effectiveness of the tool, and means for causing a relative movement between the first part and the working tool to prepare the first-mentioned part for a predetermined assembled relation with the latter parts.

7. In an apparatus for preparing a member for assemblage with another member, a material working means, means for normally urging the working means longitudinally in one direction, means eccentrically mounted for supporting the member to be prepared for assemblage adjacent the working portion of the working means, means for controlling the effectiveness of the working means by utilizing another member forming a part of the assemblage, and means for causing a relative movement between the first member and the working means to prepare the first mentioned member for a predetermined assembled relation with the latter member.

8. In an apparatus for preparing a member for assemblage with another member, a tool, means for eccentrically supporting a member to be prepared for assemblage adjacent the tool, means for normally urging the tool longitudinally away from said member, means for causing a relative movement between the tool and said member through a distance determined by the overall dimensions of a member with which the first mentioned member is to be assembled, and means for causing the tool to perform work upon the first mentioned member.

9. In an apparatus for preparing a member for assemblage with another member, a tool, means for eccentrically supporting a member to be prepared for assemblage adjacent the tool, means for normally urging the tool away from said member, means for effecting a longitudinal displacement of the tool toward said member a distance determined by the overall dimensions of a member with which the first mentioned member is to be assembled, and means for causing a relative movement between the first mentioned member and the tool to perform work upon the first mentioned member.

10. In an apparatus for preparing a member for assemblage with another member, a material working means, means for normally urging the working means in one direction, means for supporting a member to be prepared for assemblage adjacent a working portion of the working means, a resiliently actuated lever for holding another member forming a part of the assemblage in operative relation with another portion of the working means to control the effectiveness of the working means, and means for causing a relative movement between the first member and the working means to prepare the first mentioned member for a predetermined assembled relation with the latter member.

In witness whereof, I hereunto subscribe my name this 30th day of March, A. D. 1927.

MARION LLEWLLYN STRAWN.